United States Patent
Gao et al.

(10) Patent No.: US 8,441,821 B2
(45) Date of Patent: May 14, 2013

(54) CIRCUITS AND METHODS FOR ALTERNATING CURRENT-TO-DIRECT CURRENT CONVERSION

(75) Inventors: Jianlong Gao, Chengdu (CN); Tiesheng Yan, Chengdu (CN); Jianping Xu, Chengdu (CN)

(73) Assignee: O2Micro, Inc., Santa Clara, CA (US)

( * ) Notice: Subject to any disclaimer, the term of this patent is extended or adjusted under 35 U.S.C. 154(b) by 266 days.

(21) Appl. No.: 12/966,485

(22) Filed: Dec. 13, 2010

(65) Prior Publication Data

US 2012/0099354 A1 Apr. 26, 2012

(30) Foreign Application Priority Data

Oct. 22, 2010 (CN) .......................... 2010 1 0527038

(51) Int. Cl.
*H02M 7/04* (2006.01)

(52) U.S. Cl.
USPC .......................................................... 363/84

(58) Field of Classification Search ............... 363/84, 363/89, 108, 126, 132
See application file for complete search history.

(56) References Cited

U.S. PATENT DOCUMENTS

| | | | |
|---|---|---|---|
| 8,093,839 B2 * | 1/2012 | Jin et al. | 315/308 |
| 8,134,848 B2 * | 3/2012 | Whittam et al. | 363/84 |
| 2006/0176719 A1 | 8/2006 | Uruno et al. | |
| 2010/0327829 A1 * | 12/2010 | Bucur et al. | 323/282 |

FOREIGN PATENT DOCUMENTS

| | | |
|---|---|---|
| CN | 1638253 A | 7/2005 |
| JP | 10174450 A | 6/1998 |
| JP | 2002199717 A | 7/2002 |

* cited by examiner

*Primary Examiner* — Adolf Berhane
*Assistant Examiner* — Yemane Mehari

(57) ABSTRACT

An AC-to-DC converter for converting an AC voltage to a DC voltage includes a first converter, a second converter, a sense circuit, a controller, and an enabling circuit. The first converter converts an AC voltage to a first DC voltage. The second converter converts the first DC voltage to a second DC voltage. The sense circuit coupled to the first and second converters provides a first sense signal indicative of the first DC voltage and a second sense signal indicative of the AC voltage. The controller coupled to the first and second converters controls the first and second DC voltages. The enabling circuit coupled to the sense circuit generates a control signal to the controller to disable both the first converter and the second converter by comparing the first sense signal to a first threshold voltage and comparing the second sense signal to a second threshold voltage.

20 Claims, 11 Drawing Sheets

CIRCUITS AND METHODS FOR ALTERNATING CURRENT-TO-DIRECT CURRENT CONVERSION

RELATED APPLICATION

This application claims priority to Patent Application No. 201010527038.6, titled "Circuits and Methods for Alternating Current-to-Direct Current Conversion", filed on Oct. 22, 2010, with the State Intellectual Property Office of the People's Republic of China.

BACKGROUND

Alternating current-to-direct current (AC-to-DC) converters convert an AC voltage to a DC voltage and can be used in various applications, such as power factor correction (PFC) circuits in televisions and notebooks.

FIG. 1 shows a conventional AC-to-DC converter 100 to convert an AC voltage $V_{IN}$ to a DC voltage $V_{OUT}$. By way of example, the converter 100 includes a full-bridge rectifier 150, a boost converter 110, and an asymmetrical half-bridge flyback (AFB) converter 120. The boost converter 110 and the AFB converter 120 share the same controller 111. The full-bridge rectifier 150 rectifies the AC voltage $V_{IN}$ to provide a rectified voltage $V_{REC}$. The boost converter 110 converts the rectified voltage $V_{REC}$ to a DC voltage $V_{LINE}$. The AFB converter 120 further converts the DC voltage $V_{LINE}$ to a lower DC voltage $V_{OUT}$. Based on a common control signal, the controller 111 regulates the levels of the voltage $V_{LINE}$ and the voltage $V_{OUT}$.

If the current of a load powered by the AC-to-DC converter 100 decreases, the power energy consumed by the AFB converter 120 may decrease. However, the boost converter 110 may still transfer the same amount of power to the AFB converter 120. As such, the extra energy which is not consumed by the AFB converter 120 may increase the voltage $V_{LINE}$, thereby damaging circuit components.

SUMMARY

In one embodiment, an AC-to-DC converter for converting an AC voltage to a DC voltage includes a first converter, a second converter, a sense circuit, a controller, and an enabling circuit. The first converter converts an AC voltage to a first DC voltage. The second converter converts the first DC voltage to a second DC voltage. The sense circuit coupled to the first and second converters provides a first sense signal indicative of the first DC voltage and a second sense signal indicative of the AC voltage. The controller coupled to the first and second converters controls the first and second DC voltages. The enabling circuit coupled to the sense circuit generates a control signal to the controller to disable both the first converter and the second converter by comparing the first sense signal to a first threshold voltage and comparing the second sense signal to a second threshold voltage.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Reference will now be made in detail to the embodiments of the present invention, examples of which are illustrated in the accompanying drawings. While the invention will be described in conjunction with the embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Embodiments in accordance with the present invention provide AC-to-DC converters including an enabling circuit. The AC-to-DC converter converts an AC voltage to a first DC voltage, and further converts the first DC voltage to a second DC voltage. Advantageously, the enabling circuit can enable or disable the AC-to-DC converter based on the AC voltage, the first DC voltage, or the second DC voltage. As a result, the AC-to-DC converter is capable of controlling the first DC voltage within a predetermined range and preventing circuit components from undergoing undesired conditions or being damaged.

Figure 1:
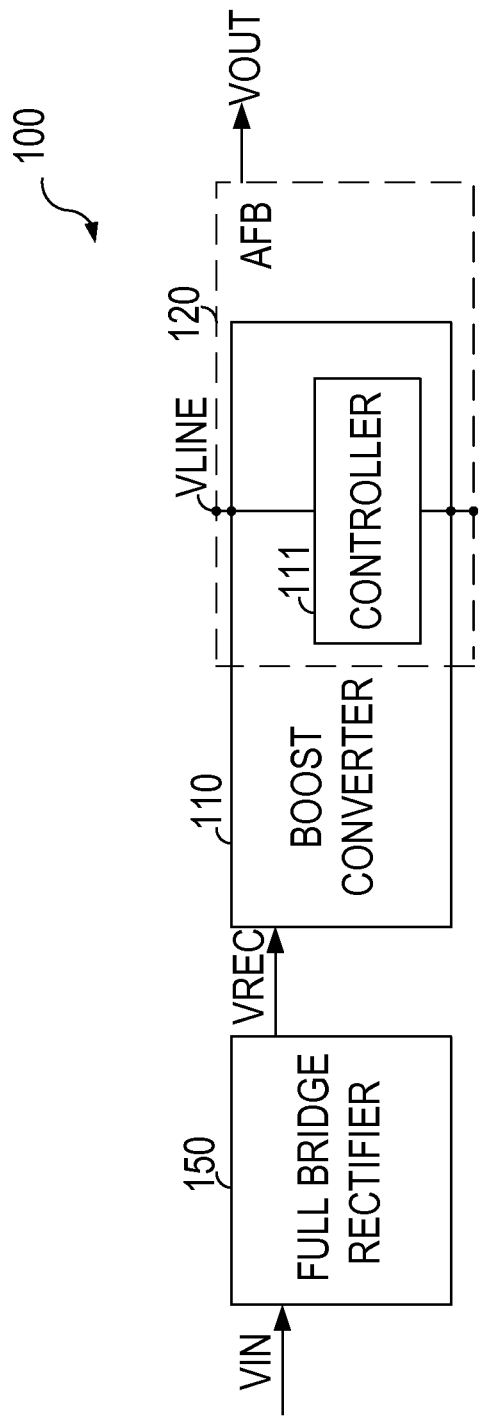
FIG. 1 shows a conventional AC-to-DC converter.
Figure 2:
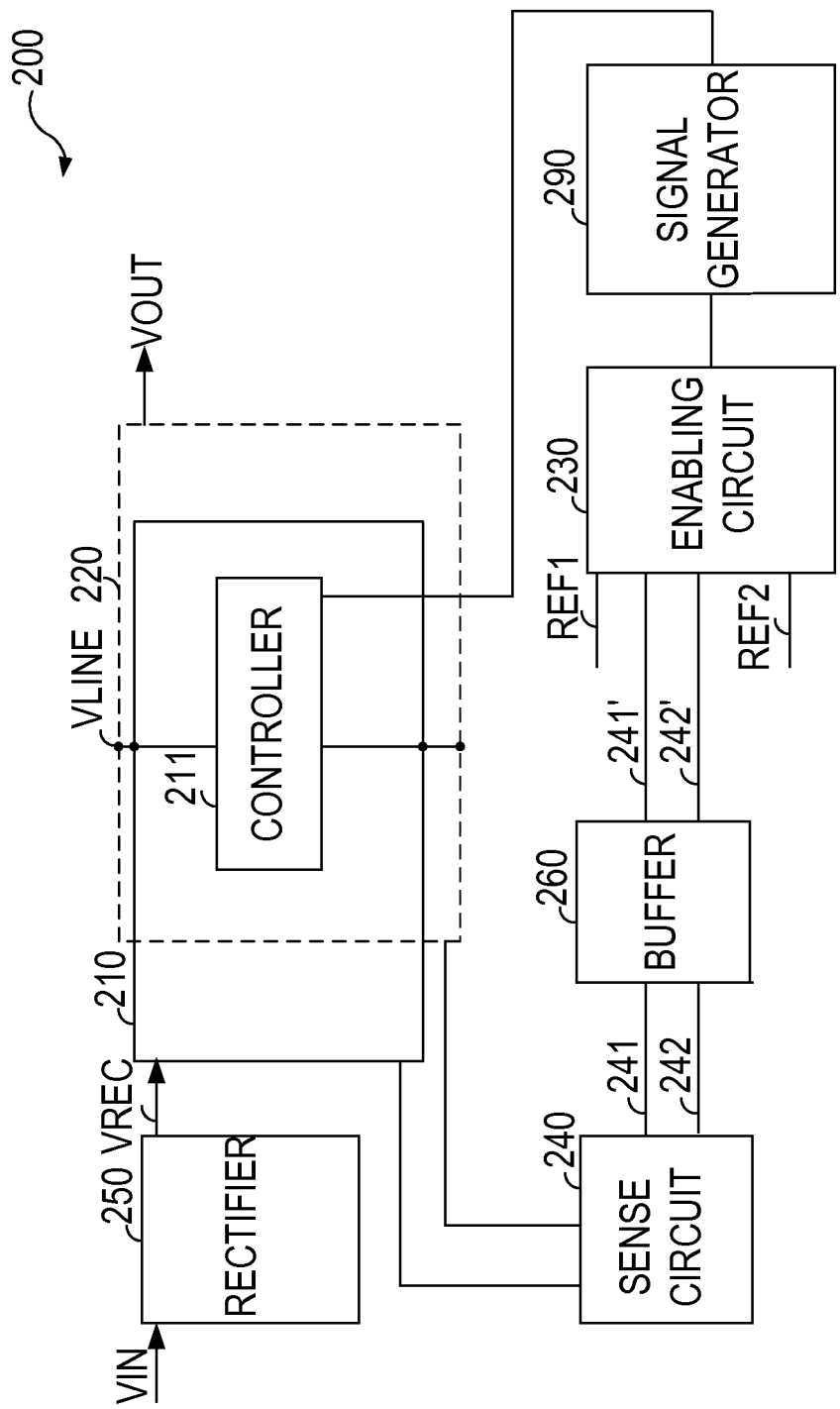
FIG. 2 illustrates a block diagram of an AC-to-DC converter, in accordance with one embodiment of the present invention.

FIG. 2 illustrates a block diagram of an AC-to-DC converter 200 for converting an AC voltage to a DC voltage, in accordance with one embodiment of the present invention. In the example of FIG. 2, the converter 200 includes converters 210 and 220, an enabling circuit 230, a sense circuit 240, a rectifier 250, a buffer 260, and a signal generator 290. A controller 211 controls both converters 210 and 220. The converter 200 converts an AC voltage $V_{IN}$ to a DC voltage $V_{OUT}$, and controls the output voltage $V_{LINE}$ of the converter 210 within a predetermined range. The rectifier 250 rectifies the AC voltage $V_{IN}$ and provides the rectified voltage $V_{REC}$ to the converter 210. Under the control of the controller 211, the converter 210 converts the rectified voltage $V_{REC}$ to a DC voltage $V_{LINE}$ and the converter 220 converts the DC voltage $V_{LINE}$ to the DC voltage $V_{OUT}$. In other words, the controller 211 controls both input and output voltages of the converter 220. In one embodiment, the voltage $V_{LINE}$ is greater than the voltage $V_{OUT}$. The sense circuit 240 coupled to the converters 210 and 220 can generate a sense signal 241 indicative of the voltage $V_{LINE}$ and a sense signal 242 indicative of the voltage $V_{REC}$. In one embodiment, the buffer 260 includes a plurality of amplifiers, and receives the sense signals 241 and 242 from the sense circuit 240 and provides the sense signals 241' and 242' respectively to the enabling circuit 230. In other words, the enabling circuit 230 receives the sense signals 241 and 242 from the sense circuit 240 via the buffer 260. The signal generator 290 is controlled by the enabling circuit 230 to enable or disable the controller 211.

The enabling circuit 230 can enable or disable the controller 211 via the signal generator 290 based on the levels of the sense signals indicative of the voltages of the converter 200, such as the sense signals 241' and 242'. If the current of a load powered by the AC-to-DC converter 200 decreases, the voltage $V_{LINE}$ and thus the sense signal 241' indicating the voltage $V_{LINE}$ increase. In one embodiment, the enabling circuit 230 enables or disables the controller 211 according to a comparison result between the sense signal 241' and a predetermined reference voltage REF1 and a comparison result between the sense signal 242' and a reference voltage REF2. The reference voltage REF2 can be predetermined or generated according to the difference between the sense signal 241' and the predetermined reference voltage REF1. As such, the converter 200 regulates the voltage $V_{LINE}$ within a predetermined range, e.g., below a predetermined voltage level, thereby preventing the circuit components from undergoing undesired conditions or being damaged.

Figure 3:
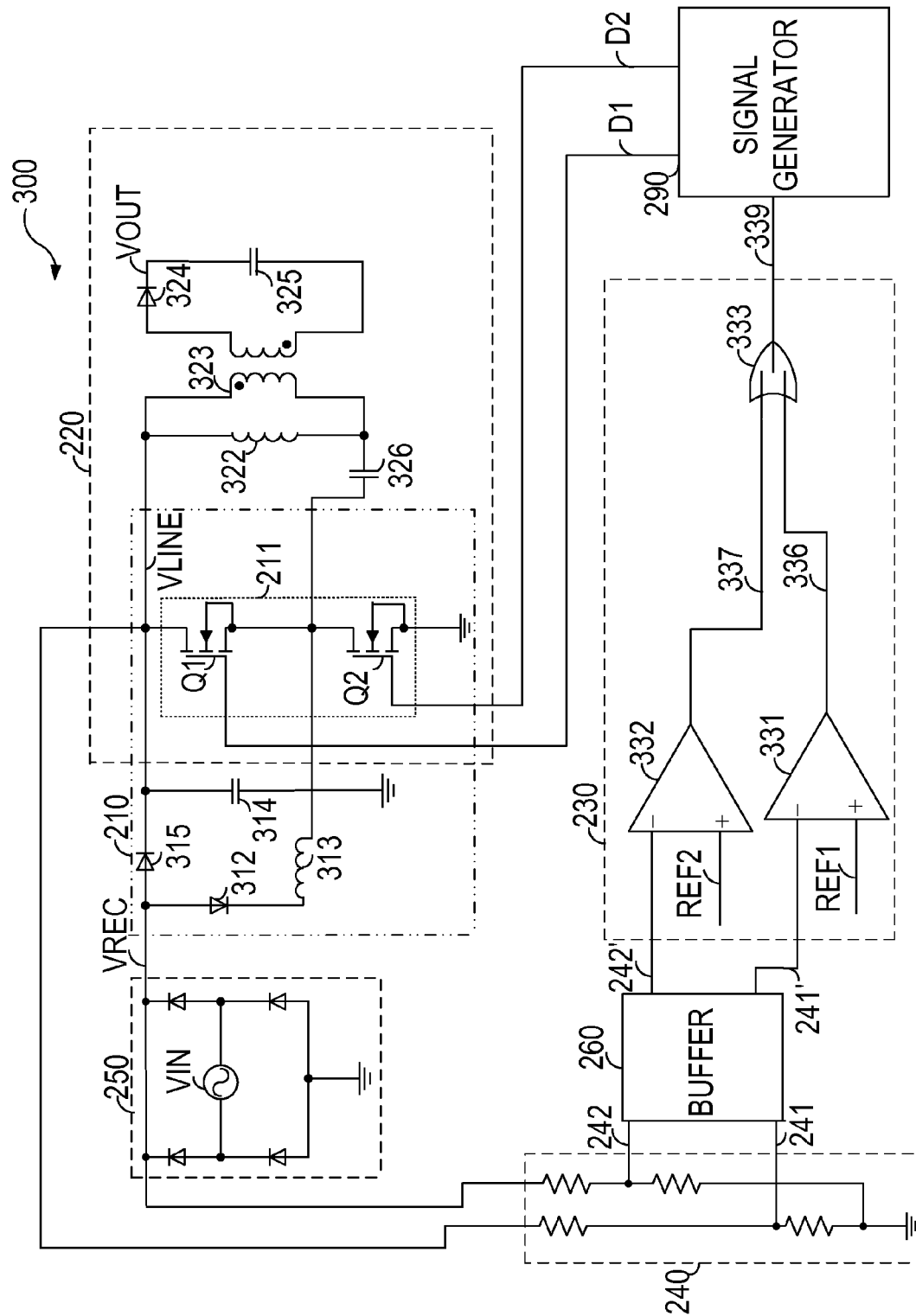
FIG. 3 shows a schematic diagram of an AC-to-DC converter, in accordance with one embodiment of the present invention.

FIG. 3 shows a schematic diagram of an AC-to-DC converter 300 for converting an AC voltage to a DC voltage, in accordance with one embodiment of the present invention. FIG. 3 is described in combination with FIG. 2. Elements labeled the same as in FIG. 2 have similar functions.

In the example of FIG. 3, the rectifier 250 is a full-bridge rectifier including four diodes for rectifying the AC voltage $V_{IN}$ to the voltage $V_{REC}$. The controller 211 can include switches Q1 and Q2. The switches Q1 and Q2 are turned on and off alternately to control both the DC voltages $V_{LINE}$ and $V_{OUT}$. The sense circuit 240 can be voltage dividers such as resistor strings. In one embodiment, the sense signal 242 is proportional to the voltage $V_{REC}$, and the sense signal 241 is proportional to the voltage $V_{LINE}$.

In the example of FIG. 3, the converter 210 is a boost converter including diodes 315 and 312, and energy storage components such as an inductor 313 and a capacitor 314. In operation, when the switch Q1 is off and the switch Q2 is on, a current $I_1$ flowing from the rectifier 250 charges the inductor 313. The current $I_1$ flows through the diode 312, the inductor 313, and the switch Q2 to ground. When the switch Q1 is on and the switch Q2 is off, the energy stored in the inductor 313 is transferred to the capacitor 314. A current $I_2$ flowing through the switch Q1 charges the capacitor 314. In one embodiment, the voltage $V_{LINE}$ provided by the capacitor 314 is greater than the voltage $V_{REC}$. As such, the rectified voltage $V_{REC}$ is converted to the DC voltage $V_{LINE}$, and the DC voltage $V_{LINE}$ is controlled by the on and off time periods of the switches Q1 and Q2.

In the example of FIG. 3, the converter 220 is an AFB converter including energy storage components such as an inductor 322, capacitors 325 and 326, and a transformer 323. The AFB converter 220 further includes a diode 324. In operation, when the switch Q1 is off and the switch Q2 is on, a current $I_3$ flowing from the rectifier 250 charges the inductor 322 and the capacitor 326, but no current flows through the transformer 323. The current $I_3$ flows through the inductor 322, the capacitor 326, and the switch Q2 to ground. When the switch Q1 is on and the switch Q2 is off, the capacitor 326 discharges via the switch Q1, and the inductor 322 discharges through the primary winding of the transformer 323. A current $I_4$ flowing through the secondary winding of the transformer 323 and the diode 324 charges the capacitor 325. The secondary winding of the transformer 323 provides the DC voltage $V_{OUT}$ to power the load powered by the AC-to-DC converter 300. As such, the DC voltage $V_{LINE}$ is converted to the DC voltage $V_{OUT}$, and the DC voltage $V_{OUT}$ is controlled by the on and off time periods of the switches Q1 and Q2.

The enabling circuit 230 disables the controller 211 via the signal generator 290 if the signal 241' indicative of the voltage $V_{LINE}$ is no less than the reference voltage REF1, and the sense signal 242' indicative of the voltage $V_{REC}$ is also no less than the predetermined reference voltage REF2, in one embodiment. In the example of FIG. 3, the enabling circuit 230 includes comparators 331 and 332, and a circuit 333. The comparator 331 can compare the sense signal 241' with the predetermined reference voltage REF1 and output a signal 336. The comparator 332 can compare the sense signal 242' with the reference voltage REF2 and output a signal 337. In one embodiment, the reference voltage REF1 is greater than the reference voltage REF2. In one embodiment, if the signal 336 is logic high or the signal 337 is logic high, the circuit 333 generates a signal 339 having a first level, e.g., logic high, to enable the controller 211. Otherwise, the circuit 333 generates the signal 339 having a second level, e.g., logic low, to disable the controller 211. The circuit 333 is an OR gate as shown in the example of FIG. 3. The comparators 331 and 332 can be hysteresis comparators. For example, the comparator 331 is a hysteresis comparator having a reference voltage REF1' as the lower threshold and the reference voltage REF1 as the higher threshold. In this case, the signal 336 can turn to low from high when the sense signal 241' increases to reach the reference voltage REF1, and remain low until the sense signal 241' drops below the reference voltage REF1'. Thus, the enabling circuit 230 disables the controller 211 when both of the signals 336 and 337 are logic low.

In the example of FIG. 3, the signal generator 290 generates control signals D1 and D2 controlling the controller 211 according to the signal 339. In one embodiment, the control signals D1 and D2 are pulse signals having a 180 degree phase difference for turning the switches Q1 and Q2 in the controller 211 on and off alternately if the signal 339 has a first level, e.g., logic high. The control signals D1 and D2 controls both the input and output voltages of the converter 220. If, however, the signal 339 has a second level, e.g., logic low, the signal generator 290 turns off both switches Q1 and Q2 to disable the controller 211.

Figure 4:
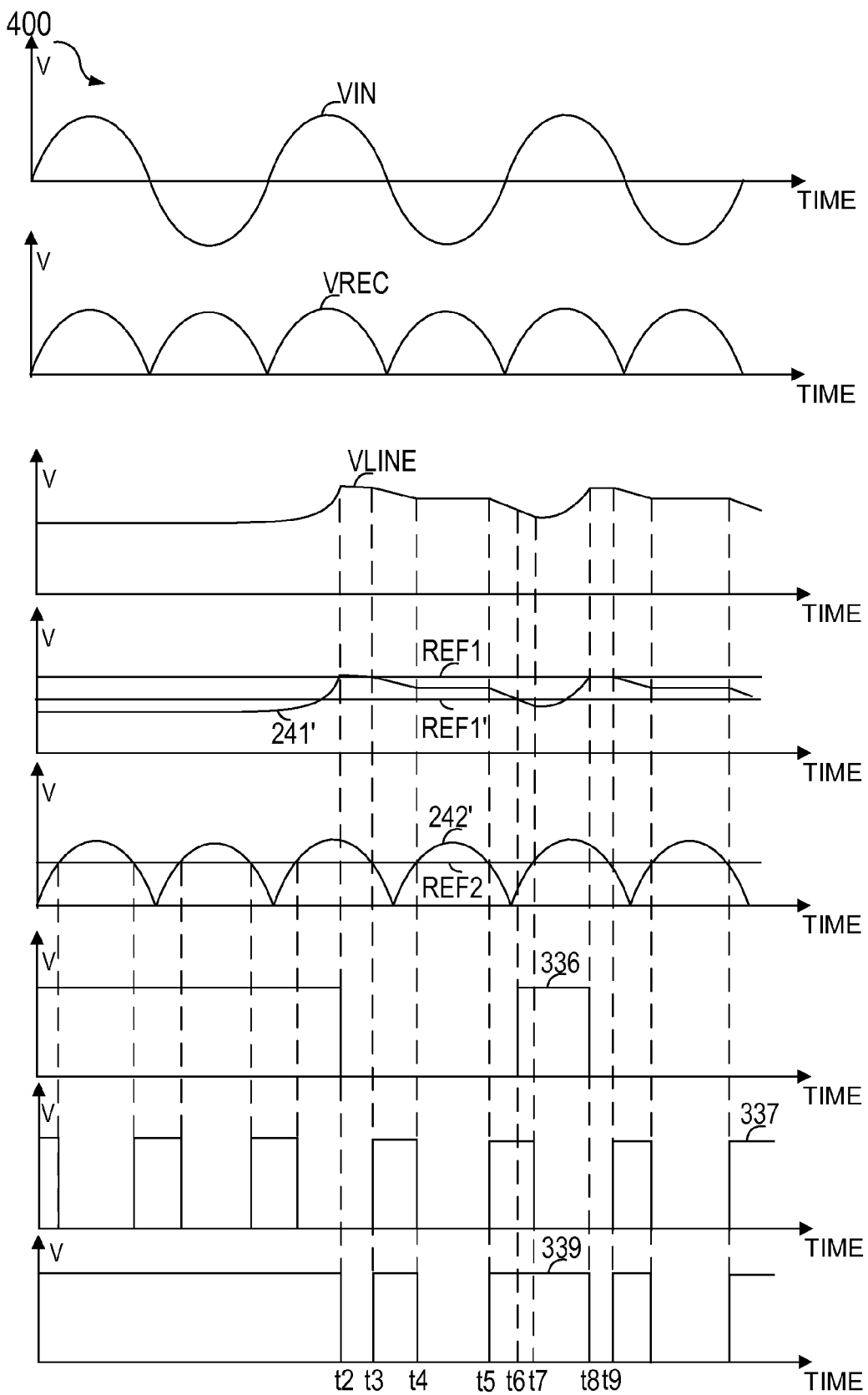
FIG. 4 illustrates waveforms associated with the AC-to-DC converter in FIG. 3, in accordance with one embodiment of the present invention.

FIG. 4 illustrates examples of waveforms associated with the converter 300. FIG. 4 is described in combination with FIG. 3. FIG. 4 shows waveforms of the voltages $V_{IN}$, $V_{LINE}$ and $V_{REC}$, the sense signals 241' and 242', the signals 336, 337 and 339, and the reference voltages REF1, REF1' and REF2. The AC voltage $V_{IN}$ is a sinusoidal voltage and is rectified to the voltage $V_{REC}$. In the example of FIG. 4, the negative level of the AC voltage $V_{IN}$ is rectified to corresponding positive level with the same amplitude.

In the example of FIG. 4, the signal 337 is logic high when the sense signal 242' is less than the reference voltage REF2, and is logic low when the sense signal 242' is no less than the reference voltage REF2. Prior to time t2, the sense signal 241' is less than the reference voltage REF1. Thus, the signal 336 is logic high, and the signal 339 having logic high enables the controller 211. As the current of the load powered by the AC-to-DC converter 300 decreases, the voltage $V_{LINE}$ and thus the sense signal 241' indicative of the voltage $V_{LINE}$ increase accordingly. At time t2, the sense signal 241' reaches the reference voltage REF1 and the sense signal 242' indicative of the voltage $V_{REC}$ is greater than the reference voltage REF2. Therefore, the signal 336 drops to logic low, and the signal 337 is logic low. Thus, the signal 339 drops to logic low to disable the controller 211, and the voltage $V_{LINE}$ and the sense signal 241' are substantially constant between time t2 and t3. Between time t3 and t4, the sense signal 242' is less than the reference voltage REF2. Thus, the signal 337 is logic high, and the signal 339 having a logic high enables the controller 211 again. Since the rectified voltage $V_{REC}$ is relatively small between time t3 and t4, the voltage $V_{LINE}$ and the sense signal 241' decrease accordingly, and the signal 336 remains logic low because the sense signal 241' does not drop below the reference voltage REF1'. Between time t4 and t5, the sense signal 242' indicative of the voltage $V_{REC}$ is greater than the reference voltage REF2 again, and the sense signal 241' remains above the reference voltage REF1'. Therefore, both of the signals 336 and 337 are logic low. The signal 339 drops to logic low to disable the controller 211, and the voltage $V_{LINE}$ and the sense signal 241' are substantially constant. Similar to the time period between time t3 and t4, during the time period between time t5 and t7, the sense signal 242' is less than the reference signal REF2, and thus the signal 337 is logic high, and the signal 339 having logic high enables the controller 211. Moreover, the voltage $V_{LINE}$ and the sense signal 241' decrease accordingly since the rectified voltage $V_{REC}$ is relatively small during the time period between time t5 and t7. Since the sense signal 241' is less than the reference voltage REF1' from time t6 and does not increase to the reference voltage REF1 until time t8, the signal 336 is logic high during the time period between t6 and t8. Thus, the signal 339 remains high during the time period between t5 and t8. At time t8, the sense signal 241' reaches the reference voltage REF1, and the sense signal 242' is greater than the reference voltage REF2 during the time period between time t8 and t9. Thus, during the time period between time t8 and t9, both of the signals 336 and 337 are logic low. Therefore, the signal 339 drops to logic low, and the voltage $V_{LINE}$ and the sense signal 241' are substantially constant between time t8 and t9. As such, the controller 211 can be enabled and disabled alternately to regulate the voltage $V_{LINE}$ within a predetermined range.

Figure 5:
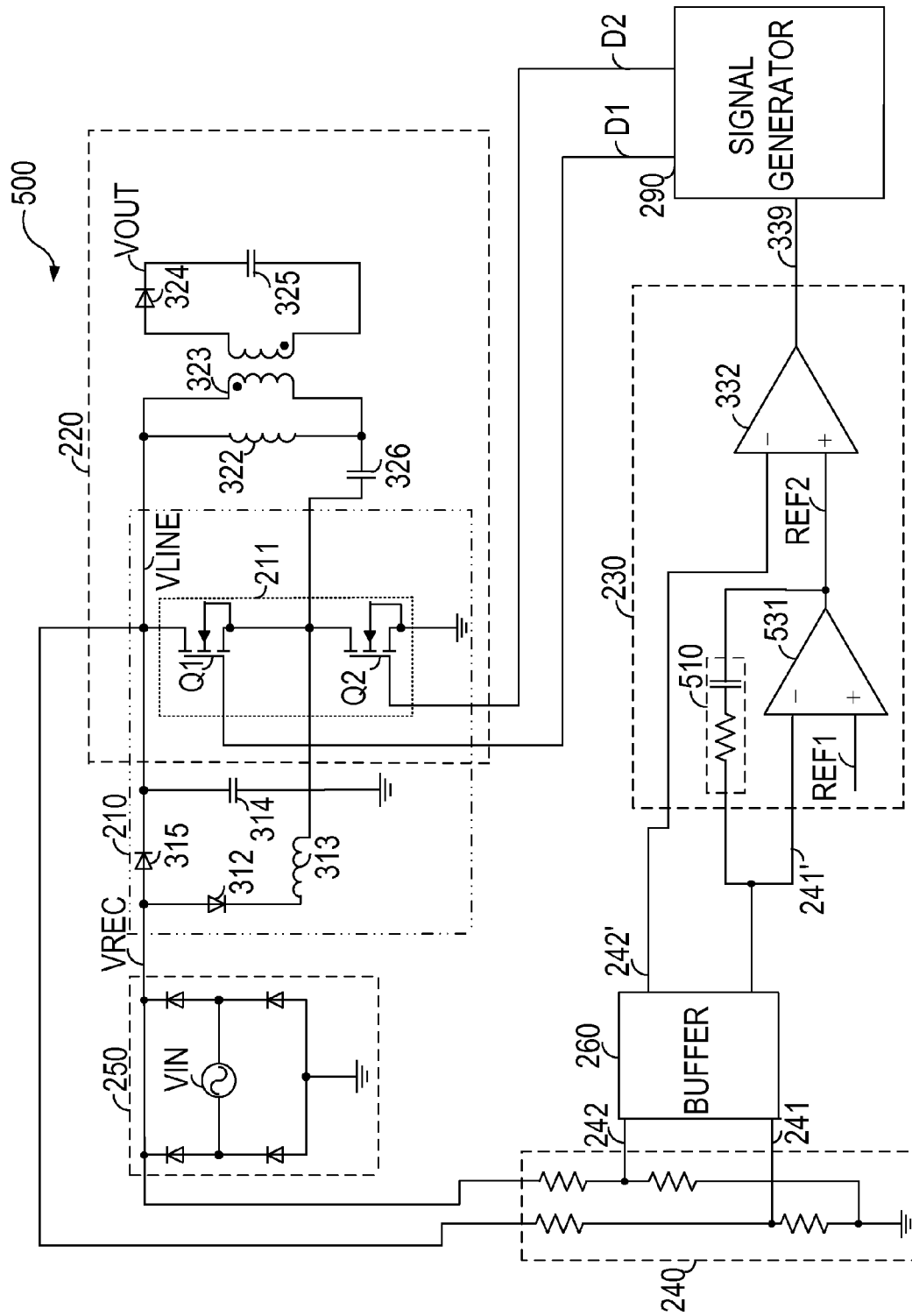
FIG. 5 shows a schematic diagram of an AC-to-DC converter, in accordance with another embodiment of the present invention.

FIG. 5 shows a schematic diagram of an AC-to-DC converter 500 for converting an AC voltage to a DC voltage, in accordance with another embodiment of the present invention. FIG. 5 is described in combination with FIG. 3. Elements labeled the same as in FIG. 3 have similar functions.

In the example of FIG. 5, the enabling circuit 230 includes an error amplifier 531 and a comparator 332. The error amplifier 531 generates an error signal REF2 indicating a difference between the sense signal 241' and the reference voltage REF1. The comparator 332 compares the error signal REF2 with the sense signal 242'. Thus, the comparator 332 generates a signal 339 to enable the controller 211 if the sense signal 242' is less than the error signal REF2. For example, when the sense signal 241' indicative of the voltage $V_{LINE}$ is less than the predetermined reference voltage REF1 such that the error signal REF2 is greater than the sense signal 242' indicative of the voltage signal $V_{REC}$, the comparator 332 generates the signal 339 to enable the controller 211. Or, when the sense signal 241' is similar to the predetermined reference voltage REF1, but the sense signal 242' is relatively small such that the sense signal 242' is less than the error signal REF2, the comparator 332 can also generate the signal 339 to enable the controller 211.

Advantageously, by varying the error signal REF2 in accordance with the sense signal 241', the converter 500 regulates the voltage $V_{LINE}$ more steadily, and the noises produced by the power components due to the oscillation of the voltage $V_{LINE}$ are avoided or reduced. In another embodiment, the error amplifier 531 can be replaced by a circuit which outputs a voltage having a constant level when the sense signal 241' is less than the reference voltage REF1, and inverse proportional to the sense signal 241' when the sense signal 241' is greater than the reference voltage REF1.

In the example of FIG. 5, the enabling circuit 230 further includes a compensation block 510 for improving the stability of the AC-to-DC converter 500. In one embodiment, the compensation block 510 includes a resistor and a capacitor coupled in series.

Figure 6:
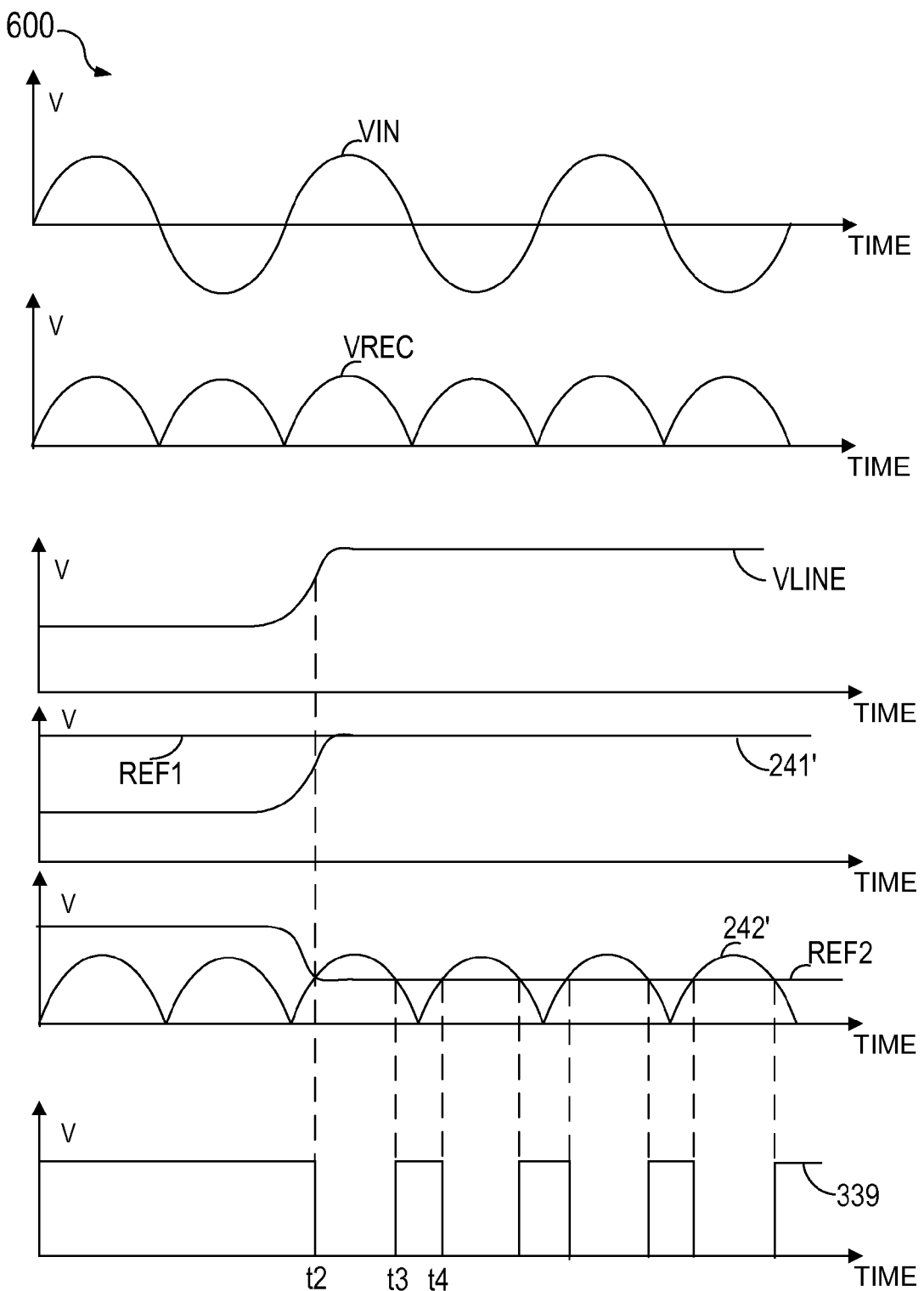
FIG. 6 shows waveforms associated with the AC-to-DC converter in FIG. 5, in accordance with one embodiment of the present invention.

FIG. 6 illustrates examples of waveforms associated with the converter 500. FIG. 6 is described in combination with FIG. 5. FIG. 6 shows waveforms of the voltages $V_{IN}$, $V_{LINE}$ and $V_{REC}$, the sense signals 241' and 242', the error signal REF2, the signal 339, and the reference voltage REF1.

Prior to time t2, the sense signal 241' is less than the reference voltage REF1 and the error signal REF2 is greater than the sense signal 242'. Thus, the signal 339 having a logic high enables the controller 211. As the current of the load powered by the AC-to-DC converter 500 decreases, the voltage $V_{LINE}$ and thus the sense signal 241' indicative of the voltage $V_{LINE}$ increase accordingly. Thus, the error signal REF2 decreases accordingly. At time t2, the error signal REF2 becomes less than the sense signal 242'. Therefore, the signal 339 drops to logic low to disable the controller 211. Between time t3 and t4, the sense signal 242' is less than the error signal REF2. Thus, the signal 339 having a logic high enables the controller 211 again. At time t4, the signal 242' is greater than the error signal REF2, and thus the signal 339 drops to logic low to disable the controller 211. As such, the controller 211 can be enabled and disabled alternately to regulate the voltage $V_{LINE}$ to a predetermined level.

Figure 7:
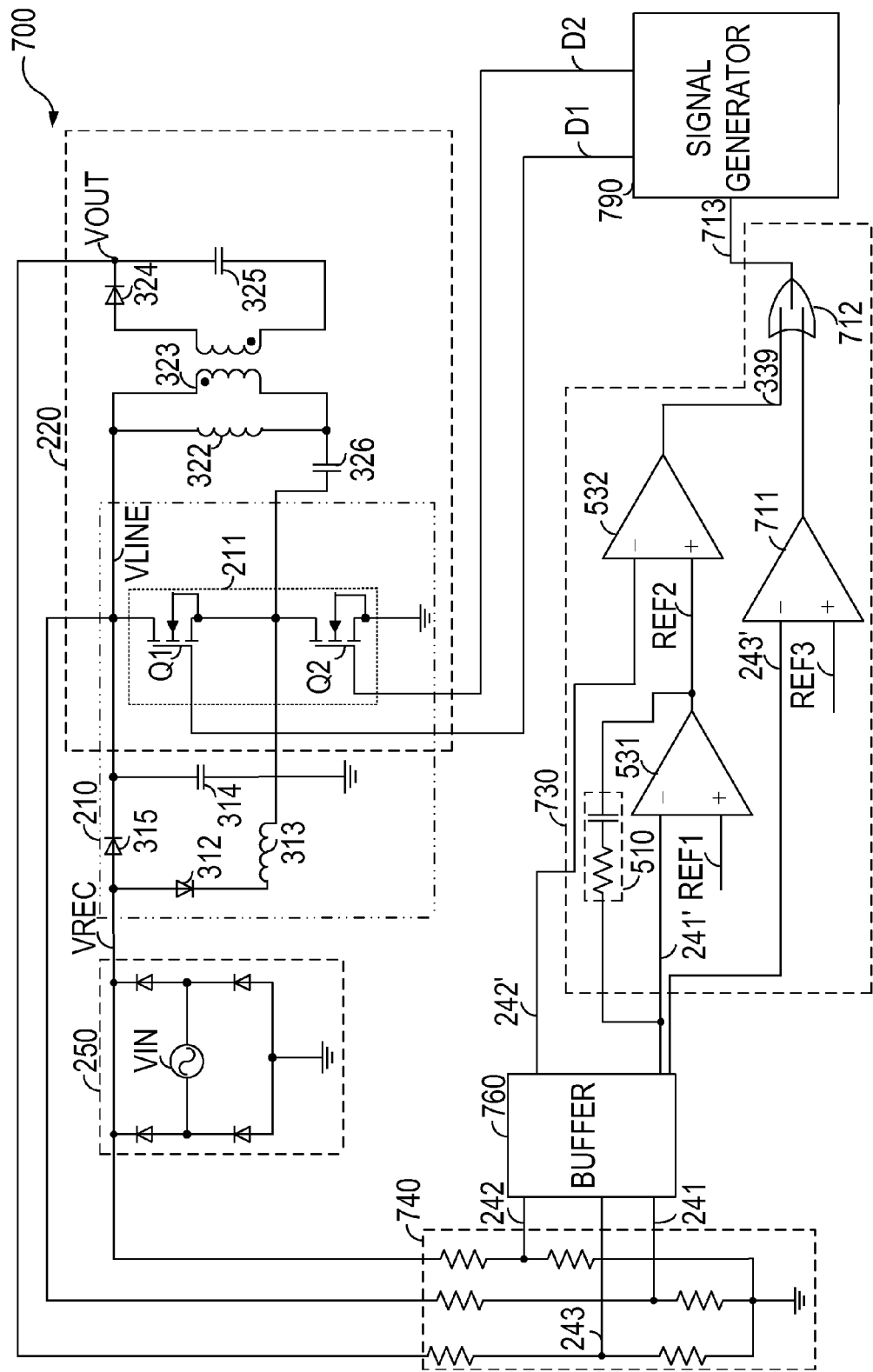
FIG. 7 shows a schematic diagram of an AC-to-DC converter, in accordance with another embodiment of the present invention.

FIG. 7 shows a schematic diagram of an AC-to-DC converter 700 for converting an AC voltage to a DC voltage, in accordance with another embodiment of the present invention. FIG. 7 is described in combination with FIG. 5. Elements labeled the same as in FIG. 5 have similar functions.

The sense circuit 740 further generates a sense signal 243 indicative of the DC voltage $V_{OUT}$, e.g., proportional to the DC voltage $V_{OUT}$. The buffer 760 further receives the sense signal 243 from the sense circuit 740 and provides a sense signal 243' to the enabling circuit 730. The enabling circuit 730 in the example of FIG. 7 further includes a comparator 711 and an OR gate 712. When the sense signal 243' indicative of the voltage $V_{OUT}$ becomes less than a predetermined reference voltage REF3, the comparator 711 outputs a signal having a logic high. Thus, the comparator 711 outputs a signal 713 via the OR gate 712 to enable the controller 211 via the signal generator 790 which has similar function to the signal generator 290 in FIG. 2. The voltages $V_{LINE}$ and $V_{REC}$ may vary slower than the voltage $V_{OUT}$. Consequently, if the voltage $V_{OUT}$ drops below the reference voltage REF3 when the current of a load powered by the AC-to-DC converter 700 increases, the converter 700 can enable the controller 211 faster than enabling the controller 211 according to the voltages $V_{LINE}$ and $V_{REC}$.

Figure 8:
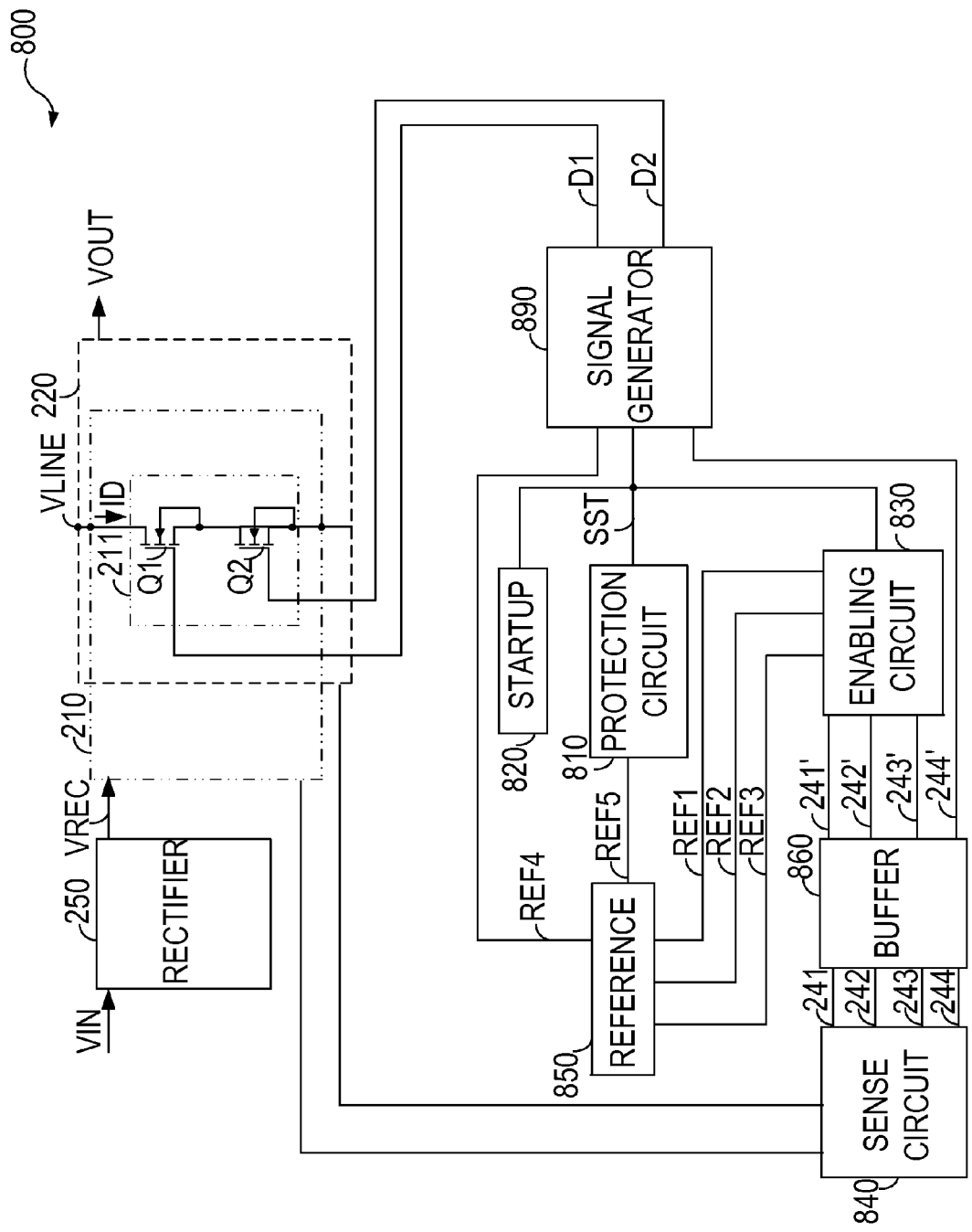
FIG. 8 shows a block diagram of an AC-to-DC converter, in accordance with another embodiment of the present invention.

FIG. 8 shows a block diagram of an AC-to-DC converter 800 for converting an AC voltage to a DC voltage, in accordance with another embodiment of the present invention. FIG. 8 is described in combination with FIG. 2. Elements labeled the same as in FIG. 2 have similar functions. The enabling circuit 830 further receives the sense signal 243' from the sense circuit 840 via the buffer 860 and the reference voltage REF3 from a reference circuit 850. The signal generator 890 further receives the sense signal 244' indicative of the DC voltage $V_{OUT}$ (e.g., inverse proportional to the DC voltage $V_{OUT}$) from the sense circuit 840 via the buffer 860. Compared to the converter 200 in the example of FIG. 2, the converter 800 in the example of FIG. 8 further includes a protection circuit 810, a startup circuit 820, and the reference circuit 850.

The reference circuit 850 provides the reference voltages REF1-REF3 to the enabling circuit 830, and provides a reference voltage REF4 to the signal generator 890. The reference circuit 850 further provides a reference voltage REF5 to the protection circuit 810. The protection circuit 810 protects the converter 800 from undesired or abnormal conditions, e.g., over-voltage, over-current, over-load, over-temperature conditions. The startup circuit 820 sets the voltage of the signal SST at a relatively low level to control the on time of the pulse signal D2 in a predetermined range, thus avoiding or reducing relatively high voltage drops on the circuit components or relatively large currents flowing through the circuit components that may damage the circuit components when the converter 800 is initially powered on.

Figure 9:
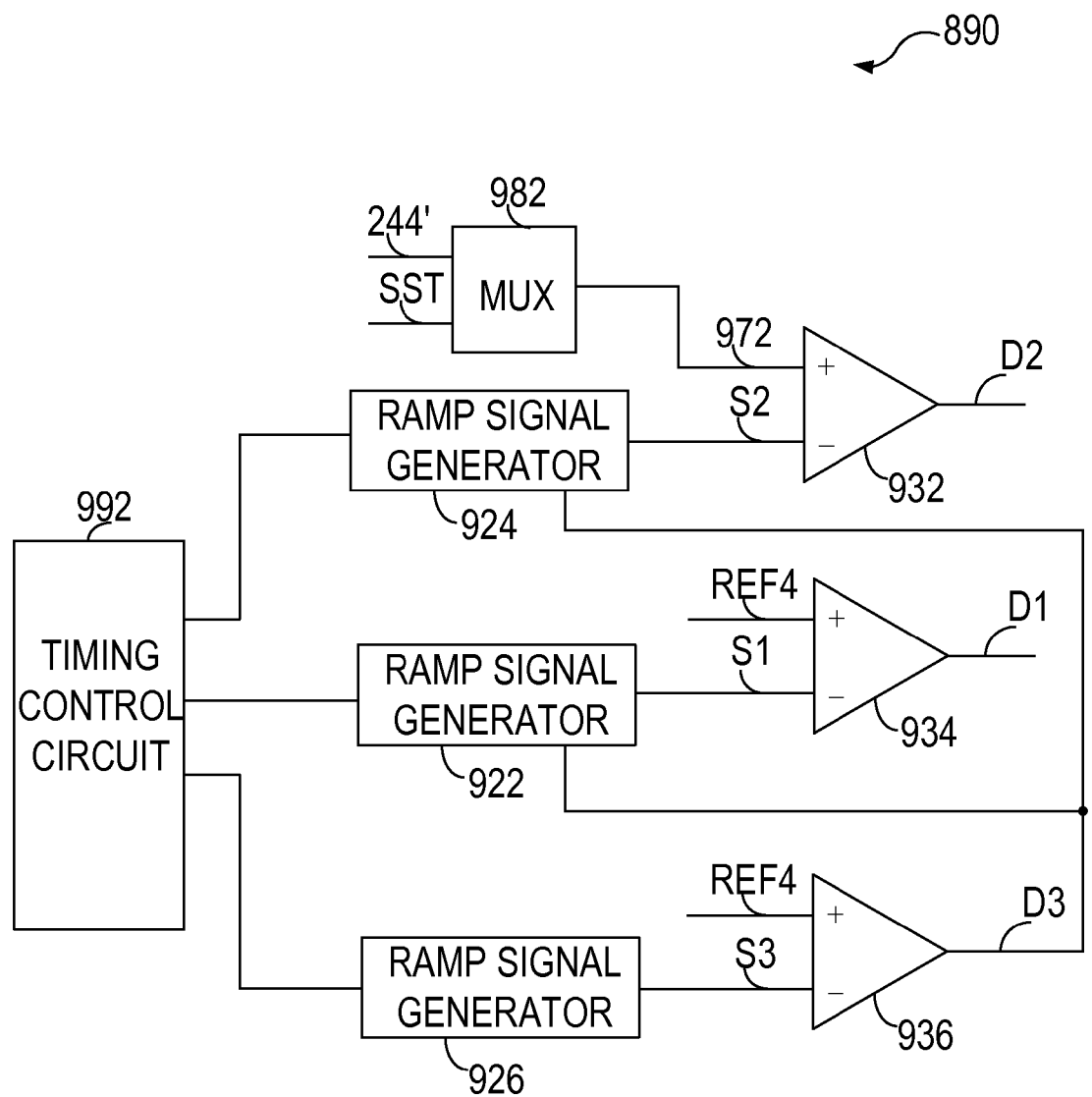
FIG. 9 shows a signal generator in FIG. 8, in accordance with one embodiment of the present invention.

FIG. 9 shows an embodiment of the signal generator 890 as shown in the example of FIG. 8. FIG. 9 is described in combination with FIG. 8. Elements labeled the same as in FIG. 8 have similar functions. In the example of FIG. 9, the signal generator 890 includes a multiplexer 982, ramp signal generators 922, 924 and 926, comparators 932, 934, and 936, and a timing control circuit 992.

The ramp signal generators 922, 924 and 926 generate ramp signals S1-S3 respectively. In one embodiment, the multiplexer 982 selects a lower signal between the sense signal 244' and the signal SST to provide an output signal 972 to the comparator 932. In one embodiment, the signal 972 is controlled no greater than the reference voltage REF4. The comparator 932 generates the pulse signal D2 according to the comparison result between the signal 972 and the ramp signal S2. In one embodiment, the greater the signal 972, the greater the duty cycle of the pulse signal D2 is. Similarly, the comparator 934 generates the pulse signal D1 according to the comparison result between the reference voltage REF4 and the ramp signal S1. In one embodiment, the greater the reference voltage REF4, the greater the duty cycle of the pulse signal D1 is.

Figure 10:
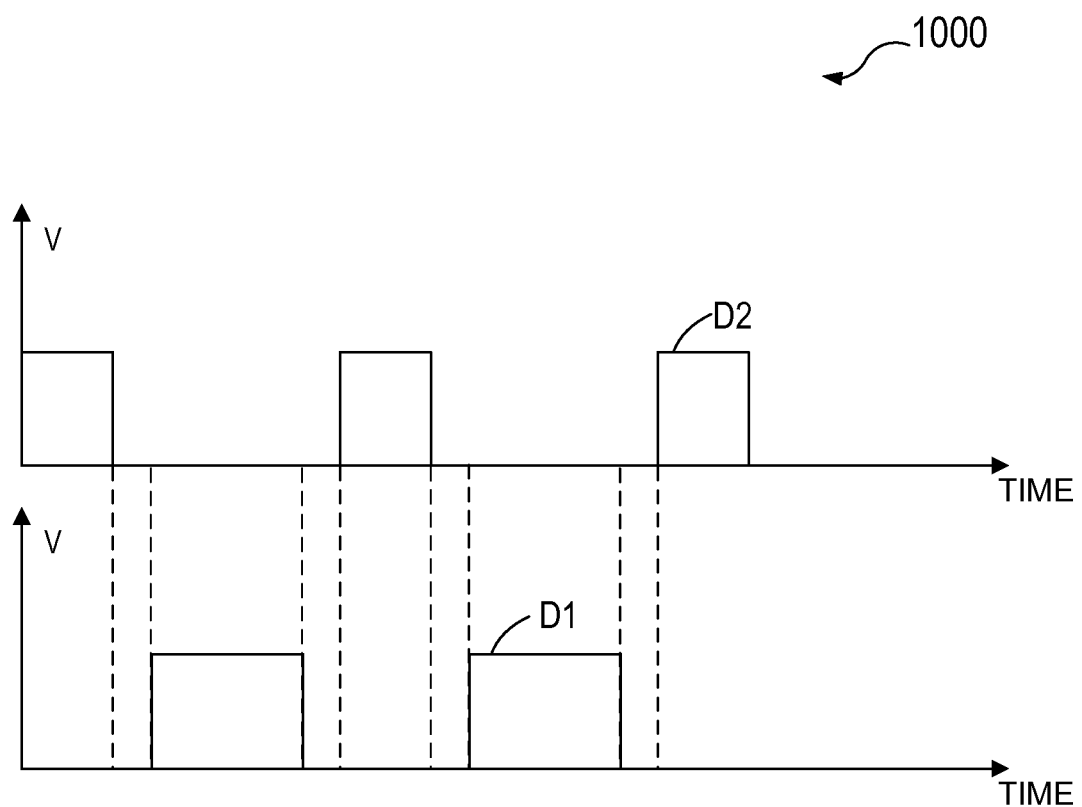
FIG. 10 shows waveforms associated with the signal generator in FIG. 9, in accordance with one embodiment of the present invention.

The comparator 936 compares the reference voltage REF4 and the ramp signal S3, and generates a signal D3 controlling the duration when both pulse signals D1 and D2 are logic low via the ramp signal generators 922 and 924. In one embodiment, the timing control circuit 992 controls the pulse signals D1 and D2 to be logic high alternately. FIG. 10 illustrates examples of waveforms of the pulse signals D1 and D2 associated with the signal generator 890 in FIG. 9. In the examples of FIG. 9 and FIG. 10, the reference voltage REF4 and the ramp signal S1 determine the duration when the pulse signal D1 is logic high, the signal 972 and the ramp signal S2 determine the duration when the pulse signal D2 is logic high, and the reference voltage REF4 and the ramp signal S3 determine the duration when both of the pulse signal D1 and D2 are logic low.

Referring back to FIG. 8, the startup circuit 820 sets the signal SST at a voltage level lower than the sense signal 244' during a start-up period when the circuit 800 is powered on initially. Thus, the multiplexer 982 in FIG. 9 transfers the signal SST to the comparator 932, and the on time of the pulse signal D2 is controlled by the signal SST. After the start-up period, the startup circuit 820 sets the signal SST at a voltage level higher than the sense signal 244'. Thus, the multiplexer 982 in FIG. 9 transfers the sense signal 244' to the comparator 932, and the on time of the pulse signal D2 is controlled by the sense signal 244'.

The protection circuit 810 receives sense signals indicative of the current $I_D$ flowing through the controller 211, the DC input voltage $V_{LINE}$ of the converter 220, and the DC output voltage $V_{OUT}$ of the converter 220 from the sense circuit 840 via the buffer 860, in one embodiment. The protection circuit 810 pulls down the signal SST to ground if there is an undesired or abnormal condition, e.g., if the current $I_D$ flowing through the controller 211, the DC input voltage $V_{LINE}$, or the DC output voltage $V_{OUT}$ exceeds a predetermined range for a predetermined time, to disable the controller 211.

The enabling circuit 830 prevents the voltage $V_{LINE}$ from exceeding a predetermined range due to the decrease of the current flowing through a load powered by the AC-to-DC converter 800. In one embodiment, the enabling circuit 830 decreases the signal SST to ground if the sense signal 241' is no less than the predetermined reference voltage REF1, and the sense signal 242' is no less than the predetermined reference voltage REF2. In another embodiment, the enabling circuit 830 decreases the signal SST to ground if the sense signal 242' is greater than the signal REF2 (shown in FIG. 5) indicative of the difference between the sense signal 241' and the predetermined reference voltage REF1. Thus, the pulse signal D2 outputs no pulses, and the controller 211 is disabled to protect the circuit components from being damaged.

In one embodiment, the sense circuit 840, the buffer 860, the enabling circuit 830, the reference circuit 850, the protection circuit 810, the startup circuit 820, and the signal generator 890 are integrated into a controller chip. Thus, the controller chip has sense pins for receiving the sense signals respectively, such as a first sense pin for receiving a first sense signal indicative of the DC voltage $V_{LINE}$, a second sense pin for receiving a second sense signal indicative of the AC voltage $V_{REC}$, and a third sense pin for receiving a third sense signal indicative of the DC output voltage $V_{OUT}$. The controller chip further includes an enabling pin for providing the signal SST according to the enabling circuit 830, the startup circuit 820 and the protection circuit 810. Moreover, the controller chip includes a first signal pin and a second signal pin coupled to the enabling circuit 830 for providing the pulse signals D1 and D2 to control the switches Q1 and Q2 respectively.

Figure 11:
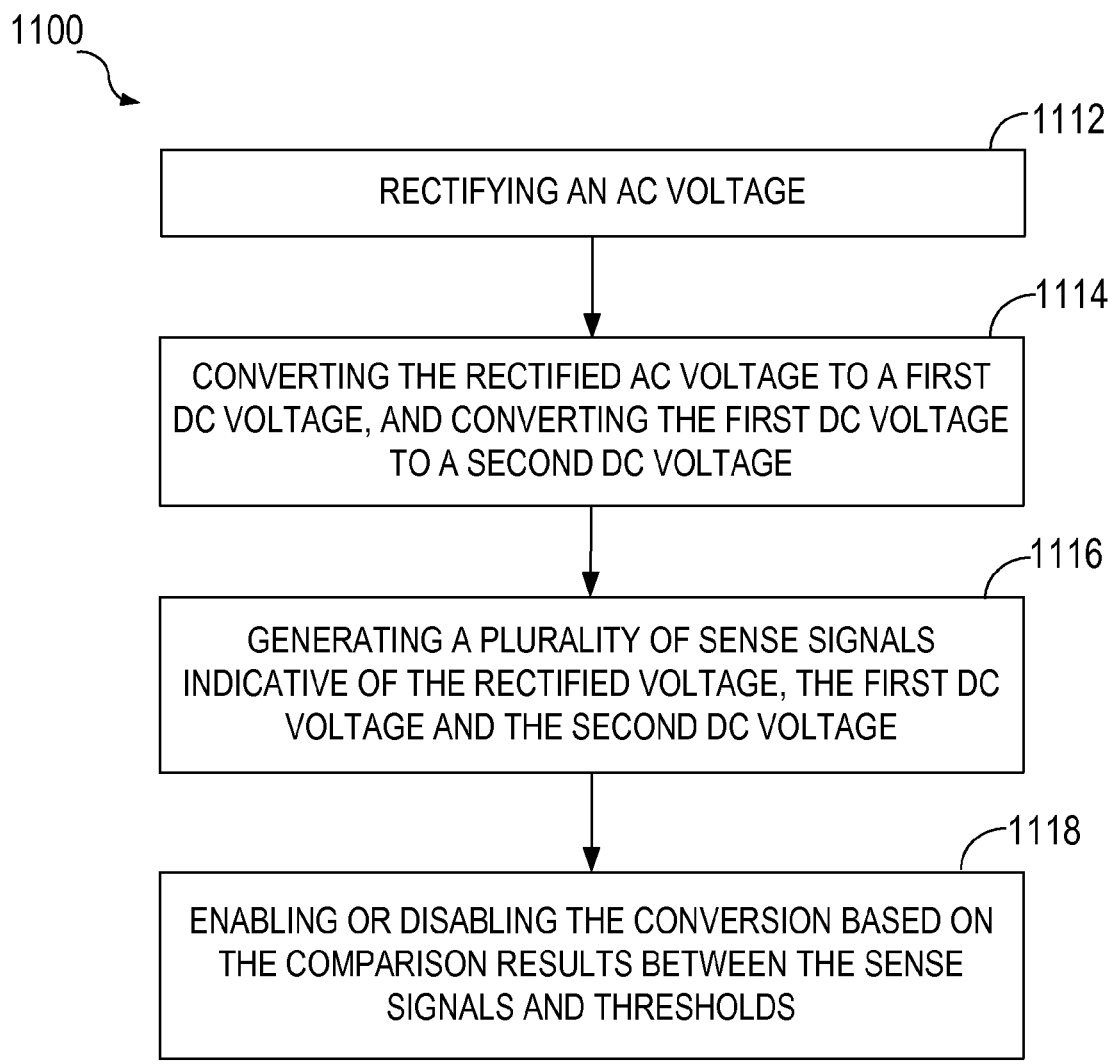
FIG. 11 illustrates a flowchart of a method for converting an AC voltage to a DC voltage, in accordance with one embodiment of the present invention.

FIG. 11 illustrates a flowchart of a method 1100 for converting an AC voltage to a DC voltage, in accordance with one embodiment of the present invention. FIG. 11 is described in combination with FIG. 2. Although specific steps are disclosed in FIG. 11, such steps are examples. That is, the present invention is well suited to performing various other steps or variations of the steps recited in FIG. 11.

In block 1112, an AC voltage signal is rectified. For example, the AC voltage $V_{IN}$ is rectified to the voltage $V_{REC}$ by the rectifier 250. In block 1114, the rectified voltage is converted to a first DC voltage, and the first DC voltage is converted to a second DC voltage. In one embodiment, the first DC voltage is greater than the second DC voltage. In block 1116, a first sense signal indicative of the first DC voltage, and a second sense signal indicative of the rectified voltage are generated. Furthermore, in one embodiment, a third sense signal indicative of the second DC voltage can be generated.

In block 1118, the conversion from the rectified voltage to the first DC voltage and the conversion from the first DC voltage to the second DC voltage can be disabled or enabled according to the comparison result between the first sense signal to a first threshold voltage, and the comparison result between the second sense signal to a second threshold voltage. In one embodiment, the conversion from the rectified voltage to the first DC voltage and the conversion from the first DC voltage to the second DC voltage can further be disabled or enabled according to the comparison result between the third sense signal to a third threshold voltage. For example, the conversion is disabled when the first sense signal is no less than the first threshold voltage and the second sense signal is no less than the second threshold voltage. In one embodiment, the second threshold voltage can be obtained according to the difference between the first sense signal and the first threshold voltage.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. An AC-to-DC converter, comprising:
    a first converter operable for converting an AC voltage to a first DC voltage;
    a second converter coupled to said first converter and operable for converting said first DC voltage to a second DC voltage;
    a sense circuit coupled to said first and second converters and operable for providing a first sense signal indicative of said first DC voltage and providing a second sense signal indicative of said AC voltage;
    a controller coupled to said first and second converters and operable for controlling said first and second DC voltages;
    an enabling circuit coupled to said sense circuit and operable for generating a control signal to said controller to disable both said first converter and said second converter by comparing said first sense signal to a first threshold voltage and comparing said second sense signal to a second threshold voltage; and
    a signal generator, coupled to said enabling circuit, operable for receiving said control signal and generating a first pulse signal and a second pulse signal according to said control signal to control said first and second DC voltages.

2. The AC-to-DC converter of claim 1, wherein said enabling circuit comprises:
    a first comparator operable for comparing said first sense signal to said first threshold voltage; and
    a second comparator operable for comparing said second sense signal to said second threshold voltage; and
    a circuit coupled to said first and second comparators and operable for generating said control signal to disable both said first and second converters when said first sense signal is no less than said first threshold voltage and said second sense signal is no less than said second threshold voltage.

3. The AC-to-DC converter of claim 2, wherein said circuit enables both said first and second converters when said first sense signal is less than said first threshold voltage.

4. The AC-to-DC converter of claim 2, wherein said circuit enables both said first and second converters when said second sense signal is less than said second threshold voltage.

5. The AC-to-DC converter of claim 1, wherein said enabling circuit comprises:
    an error amplifier operable for generating said second threshold voltage according to a difference between said first sense signal and said first threshold voltage; and
    a first comparator operable for comparing said second sense signal to said second threshold voltage.

6. The AC-to-DC converter of claim 5, wherein said enabling circuit enables said first and second converters when said second sense signal is less than said second threshold voltage.

7. The AC-to-DC converter of claim 5, wherein said enabling circuit further comprises a second comparator operable for comparing a third sense signal indicative of said second DC voltage signal to a third threshold voltage, and wherein said enabling circuit enables said first and said second converters when said third sense signal is less than said third threshold voltage.

8. The AC-to-DC converter of claim 1, wherein said controller comprises a first switch and a second switch, and wherein said enabling circuit disables said first and second switches if said first sense signal is no less than said first threshold voltage and said second sense signal is no less than said second threshold voltage.

9. The AC-to-DC converter of claim 8, wherein if said first sense signal is less than said first threshold voltage or said second sense signal is less than said second threshold voltage, said first and second switches are turned on and off alternately by said first pulse signal and said second pulse signal respectively to control both said first converter and said second converter.

10. The AC-to-DC converter of claim 1, wherein said first threshold voltage is greater than said second threshold voltage.

11. The AC-to-DC converter of claim 1, wherein said first converter comprises a boost converter.

12. The AC-to-DC converter of claim 1, wherein said second converter comprises an asymmetrical half-bridge flyback converter.

13. The AC-to-DC converter of claim 1, further comprising:
    a rectifier coupled to said first converter and operable for receiving said AC voltage and providing a rectified voltage to said first converter.

14. A method for converting an AC voltage to a DC voltage, said method comprising:
    converting said AC voltage to a first DC voltage;
    converting said first DC voltage to a second DC voltage;
    generating a first sense signal indicative of said first DC voltage;

generating a second sense signal indicative of said AC voltage;

generating a control signal to disable both said conversion from said AC voltage to said first DC voltage and said conversion from said first DC voltage to said second DC voltage according to a first comparison result between said first sense signal and a first threshold voltage and a second comparison result between said second sense signal and a second threshold voltage; and generating a first pulse signal and a second pulse signal according to said control signal to control said first DC voltage and second DC voltage.

15. The method of claim 14, further comprising:

obtaining said second threshold voltage according to a difference between said first sense signal and said first threshold voltage.

16. The method of claim 14, further comprising:

generating a third sense signal indicative of said second DC voltage; and disabling said conversion from said AC voltage to said first DC voltage and said conversion from said first DC voltage to said second DC voltage according to a third comparison result between said third sense signal and a third threshold voltage.

17. A controller for controlling a first converter and a second converter receiving an output voltage of said first converter, said controller comprising:

a first sense pin operable for receiving a first sense signal indicative of a DC input voltage of said second converter;

a second sense pin operable for receiving a second sense signal indicative of an AC input voltage of said first converter;

an enabling circuit operable for generating a control signal according to a first comparison result between said first sense signal and a first threshold voltage, and also according to a second comparison result between said second sense signal to a second threshold voltage; and a first signal pin and a second signal pin coupled to said enabling circuit and operable for providing a first pulse signal and a second pulse signal respectively to control said DC input voltage of said second converter and a DC output voltage of said second converter according to said control signal.

18. The controller of claim 17, wherein said second threshold voltage is generated according to the difference between said first sense signal and said first threshold voltage.

19. The controller of claim 17, wherein said enabling circuit enables said first and second converters if said second sense signal is less than said second threshold voltage.

20. The controller of claim 17, wherein said enabling circuit further enables said first and said second converters according to a third comparison result between a third sense signal indicative of said DC output voltage of said second converter and a third threshold voltage.

* * * * *